(12) United States Patent
Wang

(10) Patent No.: US 10,235,984 B2
(45) Date of Patent: Mar. 19, 2019

(54) KARAOKE DEVICE

(71) Applicant: Pilot, Inc., City of Industry, CA (US)

(72) Inventor: Calvin Shiening Wang, City of Industry, CA (US)

(73) Assignee: Pilot, Inc., City of Industry, CA (US)

( * ) Notice: Subject to any disclaimer, the term of this patent is extended or adjusted under 35 U.S.C. 154(b) by 0 days.

(21) Appl. No.: 15/495,475

(22) Filed: Apr. 24, 2017

(65) Prior Publication Data
US 2018/0308462 A1    Oct. 25, 2018

(51) Int. Cl.
*G10H 1/36* (2006.01)
*G06F 3/16* (2006.01)
*H04B 1/38* (2015.01)

(52) U.S. Cl.
CPC ............ *G10H 1/366* (2013.01); *G06F 3/165* (2013.01); *G10H 1/368* (2013.01); *G10H 2240/211* (2013.01); *H04B 1/38* (2013.01)

(58) Field of Classification Search
CPC .. G10H 1/366; G10H 1/368; G10H 2240/211; G06F 3/165; H04B 1/38
USPC .......................................................... 84/610
See application file for complete search history.

(56) References Cited

U.S. PATENT DOCUMENTS

| | | | | |
|---|---|---|---|---|
| 5,235,124 A * | 8/1993 | Okamura | ............. | G10H 1/0066 434/307 A |
| 5,541,999 A * | 7/1996 | Hirai | ........................ | H04R 5/04 381/1 |
| 5,734,636 A * | 3/1998 | Lee | ........................ | G10H 1/363 369/30.04 |
| 5,739,452 A * | 4/1998 | Nagata | .................... | G10H 1/366 381/63 |
| 5,808,224 A * | 9/1998 | Kato | ....................... | G10H 1/365 206/307 |
| 5,906,494 A * | 5/1999 | Ogawa | .................... | G09B 15/00 434/307 A |
| 6,083,009 A * | 7/2000 | Kim | ........................ | G10H 1/365 434/307 A |
| 6,086,380 A * | 7/2000 | Chu | ......................... | G07F 17/26 386/308 |
| 6,267,600 B1 * | 7/2001 | Song | ........................ | G10H 1/361 434/307 A |
| 6,520,776 B1 * | 2/2003 | Furukawa | ............... | G10H 1/361 341/176 |
| 8,588,432 B1 * | 11/2013 | Simon | ..................... | H04R 27/00 381/77 |
| 2004/0089141 A1 * | 5/2004 | Georges | ............... | G10H 1/0025 84/609 |
| 2004/0148419 A1 * | 7/2004 | Chen | ........................ | H04L 29/06 709/231 |
| 2006/0089170 A1 * | 4/2006 | Ashman, Jr. | .......... | H04B 1/3805 455/556.1 |
| 2007/0048711 A1 * | 3/2007 | Lee | ........................ | G09B 19/00 434/307 A |

(Continued)

*Primary Examiner* — David Warren
*Assistant Examiner* — Christina Schrieber
(74) *Attorney, Agent, or Firm* — Sheridan Ross P.C.

(57) ABSTRACT

A karaoke device includes a processor, a microphone, a wireless transceiver, an AM/FM transmitter, and a memory. The karaoke device may receive a music stream from a connected mobile device via the wireless transceiver, which may be mixed with vocals received via the microphone before the resulting audio signal is transmitted to a nearby radio via the AM/FM transmitter for playback.

20 Claims, 2 Drawing Sheets

(56) References Cited

U.S. PATENT DOCUMENTS

| | | | |
|---|---|---|---|
| 2007/0254695 A1* | 11/2007 | Langberg | G06F 1/1632 455/556.1 |
| 2008/0184870 A1* | 8/2008 | Toivola | G10H 1/365 84/610 |
| 2008/0187155 A1* | 8/2008 | Hou | H04R 1/02 381/300 |
| 2010/0192753 A1* | 8/2010 | Gao | G10H 1/0091 84/610 |
| 2015/0117674 A1* | 4/2015 | Meachum | H04L 65/1069 381/94.1 |
| 2018/0174596 A1* | 6/2018 | Cook | G10H 1/366 |
| 2018/0308462 A1* | 10/2018 | Wang | G10H 1/366 |

* cited by examiner

KARAOKE DEVICE

FIELD OF THE DISCLOSURE

The present disclosure relates to karaoke devices, and more particularly to a karaoke device for use with a remote audio source and/or speaker.

BACKGROUND

Karaoke is a popular form of entertainment in various cultures and locations, and generally requires at least a microphone, one or more loudspeakers, and a karaoke machine, and sometimes includes a display as well. The karaoke machine performs several functions, including receiving a tape, CD, DVD, flash drive, or other medium containing karaoke music and, in some embodiments, data for displaying music lyrics on an associated display; mixing the karaoke music from the medium with vocals received from the microphone; and sending the mixed music and vocals to the one or more loudspeakers for playback. Given the amount of equipment involved, the size of that equipment, and the power requirements of that equipment, karaoke has traditionally been non-portable, effectively restricting the use thereof to residential and commercial establishments.

SUMMARY

The present disclosure recognizes that a long-felt need for karaoke to be enjoyed more widely, including while traveling. In particular, the present disclosure describes karaoke devices and systems that facilitate the enjoyment of karaoke in a vehicle, or in other situations where one or more pieces of available equipment may be used for karaoke.

According to one embodiment of the present disclosure, a karaoke device includes a processor; a microphone; a wireless transceiver; a radio frequency transmitter; and a memory. The memory stores instructions for execution by the processor that, when executed, cause the processor to: mix a vocals audio signal received from the microphone with a music audio signal to generate a playback audio signal; and transmit the playback audio signal via the radio frequency transmitter.

The music audio signal may be received via the wireless transceiver. The music audio signal may be generated based on music information stored in the memory. The memory may further store or include an audio mixer module including instructions for execution by the processor that, when executed, cause the processor to: modify one of the vocals audio signal, the music audio signal, and the playback audio signal prior to transmission of the playback audio signal via the radio frequency transmitter. The modifying may include adding an echo to the one of the vocals audio signal, the music audio signal, and the playback audio signal. The karaoke device may further include a user interface by which a user may adjust a setting of the radio frequency transmitter. The karaoke device may further include a power supply that stores electrical energy for operation of the karaoke device. The karaoke device may further include a wired communication port configured to receive data for storage in the memory or power for recharging a battery of the karaoke device.

According to another embodiment of the present disclosure, a karaoke system includes a mobile device comprising a first wireless transceiver and a computer readable medium storing a plurality of music files; a radio comprising a radio tuner and at least one speaker; and a karaoke device. The karaoke device includes a processor; a microphone; a second wireless transceiver; a radio transmitter; and a memory. The memory stores first instructions that, when executed by the processor, cause the processor to: receive, from the mobile device and via the first and second wireless transceivers, a first audio signal corresponding to one of the plurality of music files; receive, from the microphone, a second audio signal corresponding to vocals; mix the first and second audio signals to generate a playback audio signal; apply an audio signal processing operation to at least one of the first audio signal, the second audio signal, and the playback audio signal; and transmit the playback audio signal to the radio via the radio transmitter.

The mobile device may further include a mobile device processor and an application stored in a mobile device memory. The application may include second instructions for execution by the mobile device processor that, when executed, cause the processor to receive user input regarding operation of the karaoke device. The user input may include at least one of a radio frequency selection for the radio transmitter and an audio signal processing operation selection. The user input may include a selection of the one of the plurality of music files. The mobile device may further include a display, and the second instructions, when executed, may further cause the mobile device processor to cause lyrics corresponding to one of the plurality of music files to be shown on the display. The audio signal processing operation may include adding an echo, adjusting the treble, adjusting the base, or equalizing.

According to yet another embodiment of the present disclosure, a karaoke system includes a radio comprising a radio tuner and at least one speaker; and a karaoke device. The karaoke device includes a processor; a microphone; a wireless transceiver; a radio transmitter; and a memory. The memory stores a plurality of music files and instructions that, when executed by the processor, cause the processor to receive, from the microphone, a first audio signal corresponding to vocals; generate, from one of the plurality of music files, a second audio signal corresponding to the one of the plurality of music files; mix the first and second audio signals to generate a playback audio signal; apply an audio signal processing operation to at least one of the first audio signal, the second audio signal, and the playback audio signal; and transmit the playback audio signal to the radio via the radio transmitter.

The memory may further store a plurality of lyrics files, each of the plurality of lyrics files corresponding to one of the plurality of music files. Also, the instructions, when executed by the processor, may further cause the processor to establish a wireless connection with a mobile device via the wireless transceiver, the mobile device comprising a screen; and receive user input from the mobile device via the wireless transceiver. The instructions, when executed by the processor, may further cause the processor to transmit at least a portion of one of the plurality of lyrics files to the mobile device, the one of the plurality of lyrics files corresponding to the one of the plurality of music files used to generate the second audio signal. The instructions, when executed by the processor, may further cause the processor to transmit information corresponding to the plurality of music files to the mobile device; and receive, via the wireless transceiver, a selection of the one of the plurality of music files for use in generating the second audio signal. The user input may include a radio frequency for use by the radio transmitter. The user input may include a selection of an audio signal processing operation from among a plurality of available audio signal processing operations stored in the memory of the karaoke device.

The term "audio signals" refers to electrical signals that represents sound. Audio signals as used herein may be electrical signals generated by an audio transducer (e.g. a microphone) and/or may be electrical signals that cause a speaker to generate a desired sound. The terms "memory," "computer-readable medium" and "computer-readable memory" are used interchangeably and, as used herein, refer to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable medium is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
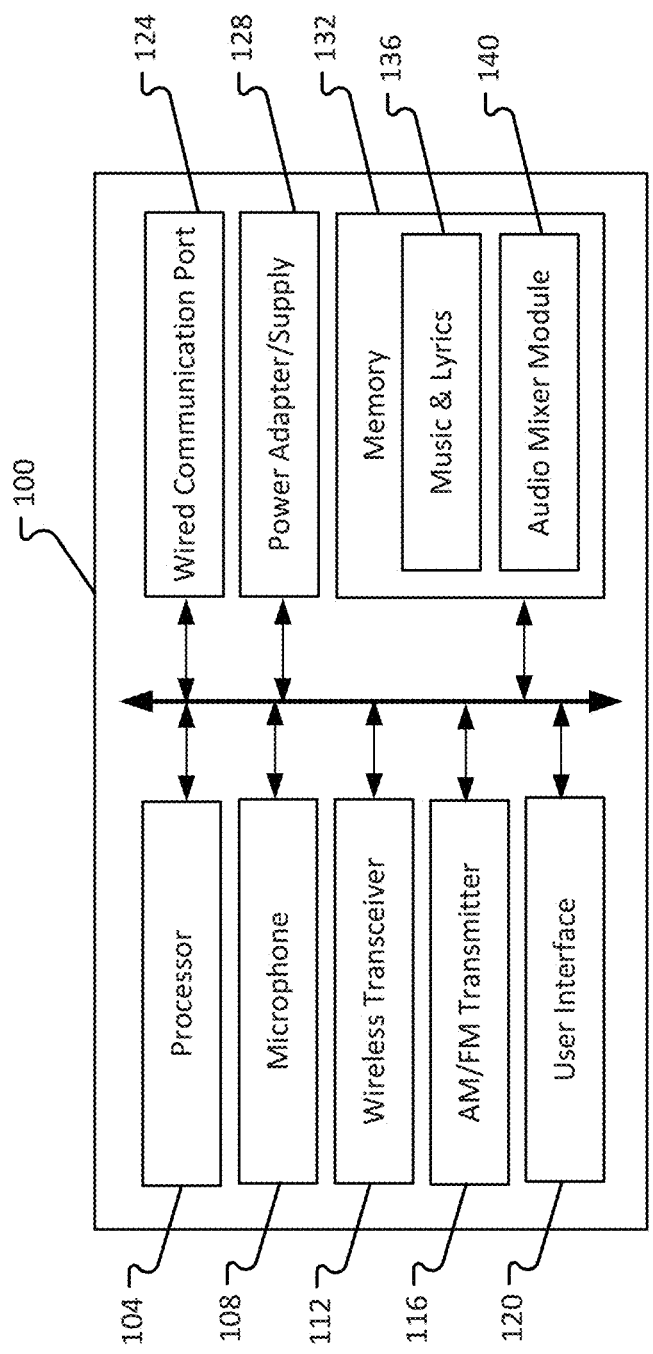
FIG. 1 is a diagram showing a karaoke system according to one embodiment of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Referring first to FIG. 1, a karaoke device 100 according to an embodiment of the present disclosure comprises a processor 104, a microphone 108, a wireless transceiver 112, an AM/FM transmitter 116, a user interface 120, a wired communication port 124, a power adapter/supply 128, and a memory 132.

The processor 104 may correspond to one or multiple microprocessors that are contained within a housing of the karaoke device 100. The processor 104 may comprise a Central Processing Unit (CPU) on a single Integrated Circuit (IC) or a few IC chips. The processor 104 may be a multipurpose, programmable device that accepts digital data as input, processes the digital data according to instructions stored in its internal memory, and provides results as output. The processor 104 may implement sequential digital logic as it has internal memory. As with most known microprocessors, the processor 104 may operate on numbers and symbols represented in the binary numeral system. The processor 104 may execute instructions stored in a firmware thereof, and may also execute instructions stored in the memory 132. The processor 104 may be used to control one or more of the microphone 108, the wireless transceiver 112, the AM/FM transmitter 116, one or more aspects of the user interface 120, the wired communication port 124, and one or more aspects of the power adapter/supply 128. The processor 104 may also be used to read data from or to write data to the memory 132.

The microphone 108 is used to convert acoustical energy corresponding to vocals provided by a user of the karaoke device 100 into electrical signals that may be, for example, mixed with a karaoke music signal and transmitted via the AM/FM transmitter 116 for playback over speakers connected to a radio tuned to receive the transmission from the AM/FM transmitter 116. The microphone 108 may be any type of microphone suitable for portable use and for capturing at least a majority of the sound frequencies produced by the human voice, particularly in song. The microphone 108 may be, for example, an electret microphone. The microphone 108 may also be a cardioid or other directional microphone, for limiting the detection of unwanted noise that may be prevalent in a vehicle or other mobile or temporary location. The microphone 108 may comprise noise-cancelling or noise-filtering features, for cancelling or filtering out noises common to the driving experience, including such noises as passenger voices, air conditioning noises, tire noise, engine noise, radio noise, and wind noise. Such features may be active or passive, and may include, for example, a physical noise protection filter placed around at least a portion of the microphone 108, or configured to be positioned between the microphone 108 and the mouth of a karaoke singer (e.g. a user of the microphone 108). In some embodiments, the microphone 108 may comprise a plurality of audio transducers, which may result in improved sound quality for captured vocals.

In some embodiments, the microphone 108 may be physically separate from the other components of the karaoke device 100, and may be connected to the karaoke device 100 via a wired or wireless connection. For example, a physically separate microphone 108 may be provided on an over-head or over-ear headset, so as to be supported directly in front of or in close proximity to a karaoke singer's mouth without requiring the karaoke singer to continuously hold the microphone 108 in front of her or his mouth. This may also improve sound quality, by helping to ensure that the microphone 108 consistently remains closer to the karaoke singer's mouth than to other noise sources. Of course, in some embodiments, the karaoke device 100 may be provided in the form of a headset, such that the benefits described above may be achieved without physically separating the microphone 108 from the other components of the karaoke device 100.

Although not shown in FIG. 1, the microphone 108 may in some embodiments (and particularly in those embodiments in which the microphone 108 is provided on a headset) comprise a small speaker configured to be placed in close proximity to an ear of a karaoke singer. In such embodiments, the speaker may be used for reproduction of the karaoke music, so as to assist the karaoke singer in hearing the karaoke music even while singing. This may be particularly useful when the karaoke device 100 is used in a car or other relatively small enclosed space.

The wireless transceiver 112 comprises hardware that allows the karaoke device 100 to connect with a mobile device, such as a smartphone, tablet, or laptop, or another computing or memory device equipped for wireless communications. The wireless transceiver 112 may in some embodiments enable the karaoke device 100 to receive streaming audio signals (corresponding to karaoke music), and may also be used in some embodiments to transmit karaoke lyrics to a mobile device for display on a screen of the mobile device. The wireless transceiver 112 may also be used, in embodiments where the microphone 108 is physically separate from the karaoke device 100, to establish a wireless connection between the microphone 108 and the other components of the karaoke device 100.

The wireless transceiver 112 may comprise a Wi-Fi card, a Network Interface Card (NIC), a cellular interface (e.g., antenna, filters, and associated circuitry), a near field communication (NFC) interface, a ZigBee interface, a FeliCa interface, a MiWi interface, a Bluetooth interface, a Bluetooth low energy (BLE) interface, or the like. The wireless transceiver 116 may comprise, for example, a transmitter, a receiver, and an antenna, and may also comprise software or firmware needed to operate such components.

The AM/FM transmitter 116 allows the karaoke device 100 to produce, and to transmit over a given frequency, an AM or FM radio signal containing both the karaoke music and the vocals provided by the karaoke singer and received via the microphone 108. This signal can then be received by a properly tuned AM or FM radio, for playback on one or more speakers associated with the AM or FM radio. For example, if the karaoke device 100 is being used in a car or other radio-equipped vehicle, a user could tune the radio in the car or other vehicle to the frequency at which the AM/FM transmitter 116 will be transmitting. The speakers of the car or other vehicle then become the speakers used for playback of the karaoke music and vocals.

Different AM/FM frequencies are utilized by existing radio stations and other sources in different locations. Accordingly, in some embodiments, the AM/FM transmitter 116 may be tunable to different frequencies, whether via the user interface 120 or via a mobile application running on a mobile device connected to the karaoke device via the wireless transceiver 112, such as the mobile application 300. In such embodiments, a user can first select a transmission frequency for the AM/FM transmitter 116 (taking care to ensure that the frequency in question is not already being used by another source), and then tune an available radio to the selected frequency. To help ensure that the AM/FM transmitter 116 does not violate existing laws and regulations governing the use of radio transmitters, the AM/FM transmitter 116 is a relatively low power transmitter, with a short range. As a result, only radios in relatively close proximity to the karaoke device 100, and more particularly to the AM/FM transmitter 116—e.g., radios within the same vehicle, in the same room, or otherwise proximately situated—are likely to receive the signals transmitted by the AM/FM transmitter 116.

Although depicted here as including an AM/FM transmitter 116, the karaoke device 100 may comprise only an AM transmitter, or only an FM transmitter. Depending on applicable laws and regulations, the karaoke device 100 may be equipped with a transmitter that operates outside the AM range of approximately 525 to 1705 kHz, and/or outside the FM range of approximately 87.5 to 108 mHz. Also in some embodiments, the karaoke device 100 may be configured to transmit audio signals corresponding to karaoke music and vocals via a wireless transceiver such as the wireless transceiver 112, rather than via an AM/FM transmitter 116. In such embodiments, the karaoke device 100 may transmit audio signals to a receiver in electrical communication with a speaker (which receiver and speaker may even be components of a mobile device such as a smartphone or tablet, or may be simply be, for example, a Bluetooth speaker)

using any suitable protocol. Such protocols may include, for example, one or more of Bluetooth, BLE, FeliCa, MiWi, ZigBee, Wi-Fi, GSM, and LTE.

The user interface 120 may comprise one or more buttons for controlling one or more features or components of the karaoke device 100. In some embodiments, for example, the user interface 120 may comprise a power button that controls the flow of electricity from the power adapter/supply 128 to the processor 104, the microphone 108, the wireless transceiver 112, the AM/FM transmitter 116, and/or other components of the karaoke device 100. The user interface 120 may further comprise one or more buttons and/or slider bars for controlling such aspects of the operation of the karaoke device 100 as pairing or otherwise connecting to an external device via the wireless transceiver 112, whether the AM/FM transmitter 116 will transmit AM signals or FM signals, the frequency at which the AM/FM transmitter 116 will transmit, selection of a source of karaoke music (e.g. the memory 132 or a device connected via the wireless transceiver 112 or the wired communication port 124), and selection of a particular piece of karaoke music. In some embodiments, the user interface 120 may comprise one or more LED lights, which illuminate in various patterns or sequences as controlled by the processor 104 to communicate various pieces of information to a user of the karaoke device 120. Also in some embodiments, the user interface 120 may comprise a screen for displaying one or more pieces of information to a user, such as the currently selected transmission frequency of the AM/FM transmitter 116, or the name of the karaoke song that is currently playing. Additionally, the user interface 120 may comprise one or more buttons for causing the karaoke device 100 to record to the memory 132 at least the vocals, if not the music and vocals, being received by the microphone 108 or transmitted via the AM/FM transmitter 116.

Although the foregoing description refers primarily to buttons, any input devices may be included in the user interface 120 and used to control the functions of the karaoke device 100, including switches, slider bars, toggles, rocker switches, rotary switches, rheostats, and potentiometers. The user interface 120 may comprise a keyboard. Additionally, non-mechanical input devices may be used instead of or in addition to mechanical devices. For example, the user interface 120 may comprise one or more touchscreens, which may display a plurality of virtual switches or controls.

The karaoke device 100 may also comprise a wired communication port 124. The wired communication port 124 may have one or more functions, including as a power port for connecting the karaoke device 100 to an external power source, whether for powering normal operation of the karaoke device 100 or for charging/recharging a battery of the power supply/adapter 128, or for connecting a mobile device to the karaoke device 100 (e.g. instead of using the wireless transceiver 112 for connecting the mobile device to the karaoke device 100), or for connecting the karaoke device 100 to a speaker for playback of karaoke music and vocals (e.g. instead of using the AM/FM transmitter 116 for transmitting the karaoke music and vocals to a nearby radio for playback), or for transferring music files to the memory 132 from an external storage device or vice versa. Additionally, in some embodiments the karaoke device 100 may be configured to cause a mobile device, connected to the karaoke device 100 via the wired communication port 124, to display lyrics corresponding to a selected piece of karaoke music or other information (e.g. status information, power information, music library information, playlist information) on a screen of the mobile device. Still further, the wired communication port 124 may be used to attach an external storage source (such as an external hard drive, or a thumb drive (also known as a flash drive or a USB drive)) to the karaoke device 100 to augment or supplement the memory 132 (e.g. by providing an expanded library of karaoke music for a user to select, or for providing additional instructions for the processor 104 that expand the feature set of the karaoke device 100, or for providing additional storage space for the storage of recorded vocals or recorded vocals and music). The wired communication port 124 may be a USB port, a Lightning port, a Firewire port, an Ethernet port, or any other port through which data and/or power may be transferred. Where the USB protocol is used, the wired communication port 124 may be one or more of Type A, Type B, Mini-A, Mini-B, Micro-A, and/or Micro-B ports. Additionally, the karaoke device 100 may in some embodiments comprise a plurality of wired communication ports 124.

The power adapter/supply 128 may comprise circuitry for receiving power from an external source and accomplishing any signal transformation, conversion or conditioning needed to provide an appropriate power signal to the processor 104 and the other powered components of the karaoke device 100. Additionally or alternatively, the power adapter/supply 128 may comprise one or more batteries for supplying needed power to the karaoke device 100. Such batteries may be used for normal operation, or such batteries may provide backup power (e.g. when power from an external source is not available). In embodiments comprising one or more batteries, the batteries may be removable and replaceable, and/or the batteries may be rechargeable. In embodiments with rechargeable batteries, the karaoke device 100 may utilize the wired communication port 124 as a power inlet port, or the power adapter/supply 128 may comprise a dedicated charging port for recharging rechargeable batteries contained therein.

The memory 132 may be used to store any electronic data needed for operation of the karaoke device 100 and/or any electronic data recorded by the karaoke device 100. For example, the memory 132 may store any firmware needed for allowing the processor 104 to operate and/or communicate with the various components of the karaoke device 100, as needed, and to communicate with one or more mobile devices connected to the karaoke device 100 via the wireless transceiver 112 or the wired communication port 124. The memory 132 may correspond to any type of non-transitory computer-readable medium. In some embodiments, the memory 132 may comprise volatile or non-volatile memory and a controller for the same. Non-limiting examples of memory 132 that may be utilized in the karaoke device 100 include RAM, ROM, buffer memory, flash memory, solid-state memory, or variants thereof.

The memory 132 may include, in particular, a music and lyrics module 136 and an audio mixer module 140. The music and lyrics module 136, where included, stores a selection of karaoke music for accompanying a user of the karaoke device 100. In some embodiments, the music and lyrics module 136 comprises only a few musical selections (e.g. five or less), while in other embodiments the music and lyrics module 136 may comprise more musical selections. Also in some embodiments, the music and lyrics module 136 may comprise information needed to allow the processor 104 to cause a mobile device connected to the karaoke device 100 to display the lyrics for a given karaoke music selection on a screen thereof. Alternatively, in embodiments where the user interface 120 of the karaoke device 100 comprises a screen, the music and lyrics module 136 may comprise information needed to allow the processor 104 to cause the lyrics for selected karaoke music to be displayed on the screen of the user interface 120. The information stored in the music and lyrics module 136 may be changed from time to time, whether by deleting existing music and lyrics information or adding new music and lyrics information.

The audio mixer module 140 may comprise instructions necessary to cause the processor 104 to combine audio signals received from the microphone 108 with audio signals corresponding to karaoke music (whether received from the music and lyrics module 136 or created based on the information in the music and lyrics module 136, or received from a mobile device or other external storage source via the wireless transceiver 112 or the wired communication port 124). The audio mixer module 140 may also comprise instructions necessary to cause the processor to process, filter, modulate, or otherwise modify one or both of the audio signals corresponding to the vocals and the audio signals corresponding to the karaoke music, or to modulate the mixed audio signal. For example, the audio mixer module 140 may comprise instructions necessary to modify an audio signal by adding an echo, adjusting the treble and/or the base, equalizing the audio signal, and for conducting any other known audio signal processing function.

Figure 2:
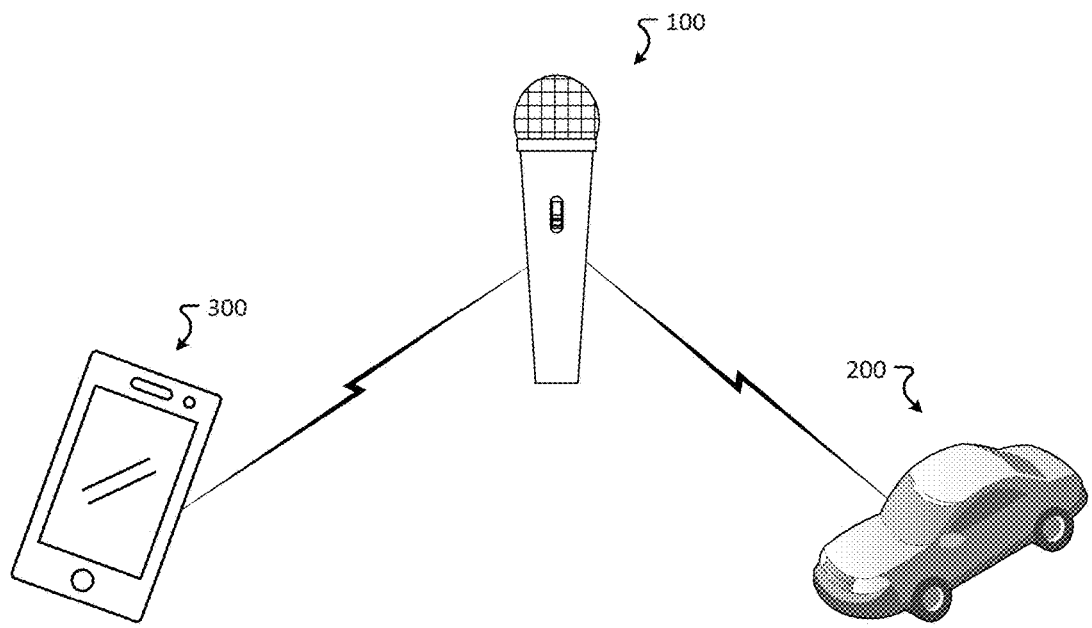
FIG. 2 is a block diagram of a portable karaoke device according to another embodiment of the present disclosure.
Figure 3:
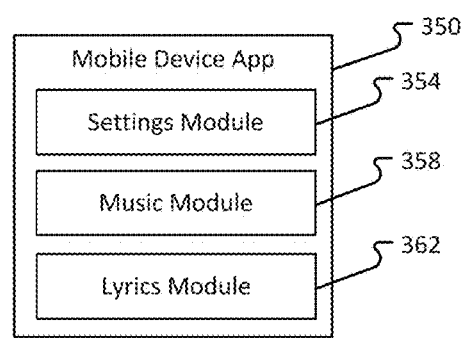
FIG. 3 is a block diagram of an application for execution by a processor of a mobile device according to a further embodiment of the present disclosure.

Turning now to FIG. 2, a karaoke device 100 may establish a wireless connection through the wireless transceiver 112 with a mobile device 300 that also comprises a wireless transceiver. As noted above, the karaoke device 100 may additionally or alternatively establish a wired connection with a mobile device 300 via the wired communication port 124. The karaoke device 100 may also broadcast an AM or FM radio signal to a vehicle radio (200), thus causing the radio (when properly tuned) to play the music and vocals broadcast by the karaoke device 100. As also noted above, the karaoke device 100 may be used in other, non-vehicle embodiments as well, whether in combination with a radio that can receive the transmitted AM or FM signal, or with a speaker to which the karaoke device 100 can connect via the wireless transceiver 112, or with a speaker to which the karaoke device 100 can connect via the wired communication port 124. Also in some embodiments, the karaoke device 100 may be connected to a plurality of mobile devices 300, each of which may be used for different functions (e.g. one to provide music, another to display lyrics), or the same function.

Referring now to FIG. 4, the mobile device 300 may be provided with an app 350 that allows a user to interface with the karaoke device 100 over a direct wireless or wired connection using the mobile device 300. The app 350 may comprise, for example, a settings module 354, a music module 358, and a lyrics module 362. The settings module 354 may comprise instructions for execution by a processor of the mobile device 300 that enable the mobile device 300 to display to a user thereof a graphical user interface for controlling one or more features of the karaoke device 100. For example, the settings module 354 may enable the user to adjust one or more audio processing settings of the karaoke device 100 (e.g. by enabling or disabling one or more of the instruction sets stored in the audio mixer module, or by indicating the degree to which a certain audio processing technique should be applied, or by adjusting slider bars controlling the relative volume of the base and treble frequency ranges), select whether the AM/FM transmitter 116 will transmit at an AM frequency or an FM frequency, and/or tune the AM/FM transmitter 116 to a particular AM or FM frequency. Changes to the settings of the karaoke device 100 made using the mobile device 300 as described above may be communicated via the wireless transceiver 112 or the wired communication port 124 to the karaoke device 100, where the processor 104 may implement the changed settings.

The app 350 may also comprise a music module 358. The music module may be configured, in some embodiments, to stream selected pieces of music from a music library on the mobile device to the karaoke device 100 via the wireless transceiver 112 or the wired communication port 124, as appropriate. In other embodiments, the music module may comprise a music library (which may, in some embodiments, be a karaoke-specific music library), from which a user may choose a musical selection to be streamed to the karaoke device 100, or assemble a playlist of music to be streamed in sequence to the karaoke device 100.

The app 350 may further comprise a lyrics module 362. The lyrics module 362 may store lyrics for one or more pieces of music stored in the music module 358 or in a music library of the mobile device 300. The lyrics module 362 may be configured, in some embodiments, to search the Internet (via a communication transceiver of the mobile device 300) for lyrics to a given piece of music. Additionally, the lyrics module 362 may be configured as instructions that cause a process of the mobile device 300 to display lyrics for a given piece of music to a user of the karaoke device 100 while the music is being streamed to the karaoke device 100 from the mobile device 300, or to provide information to the karaoke device 100 that may be used by the processor 104 to cause appropriate lyrics to be displayed on a screen of the user interface 120 or of another mobile device 300. In some embodiments, the lyrics module 362 may be configured to display the lyrics for a particular musical selection line-by-line, so that a user sees a given line of music at the appropriate time to sing that line of music. Also in some embodiments, the lyrics module 362 may be configured to sequentially highlight each word of the lyrics as each word is to be sung. In such embodiments, the lyrics module 362 may store information about when in a given piece of music a particular sentence or word is sung.

In some embodiments of the present disclosure, a mobile device 300 may stream karaoke music directly to an in-vehicle sound system via a Bluetooth or other wireless or wired connection. In such embodiments, the karaoke device 100 may stream vocals received via the microphone 108 directly to the in-vehicle sound system via a separate Bluetooth or other wireless or wired connection, or may transmit the vocals via the AM/FM transmitter 116 to the in-vehicle sound system. In such embodiments, the in-vehicle sound system may be configured to play the music and the vocals simultaneously, or may be configured to actually mix the music and the vocals into a single audio stream prior to playback.

Also in some embodiments, the karaoke device 100 may be configured to stream vocals received via the microphone 108 to the mobile device 300, and the mobile device 300 may be configured to mix the vocals with music provided by the mobile device 300 prior to transmitting the mixed audio signals to an in-vehicle sound system for playback.

In still other embodiments, one or more components of the karaoke device 100, or all of the components of the karaoke device 100, may be provided in a mobile device, which may then be used as a karaoke device without any need for connecting to a separate mobile device. Also in some embodiments, a karaoke system comprising a karaoke device 100 and a mobile device 300 may be configured to play the music and vocals via one or more speakers in the mobile device, thus rendering a separate sound system (e.g. a radio or in-vehicle sound system) unnecessary.

A number of variations and modifications of the foregoing disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, and ARM® Cortex-A and ARM926EJ-S™ processors. A processor as disclosed herein may perform computational functions using any known or future-developed standard, instruction set, libraries, and/or architecture.

I claim:

1. A karaoke system, comprising:
    a mobile device comprising a first wireless transceiver and a computer readable medium storing a plurality of music files;
    a radio comprising a radio tuner and at least one speaker; and
    a karaoke device comprising:
        a processor;
        a microphone;
        a second wireless transceiver;
        a radio transmitter; and
        a memory, the memory storing first instructions that, when executed by the processor, cause the processor to:
            receive, from the mobile device and via the first and second wireless transceivers, a first audio signal corresponding to one of the plurality of music files;
            receive, from the microphone, a second audio signal corresponding to vocals;
            mix the first and second audio signals to generate a playback audio signal;
            apply an audio signal processing operation to at least one of the first audio signal, the second audio signal, and the playback audio signal; and
            transmit the playback audio signal to the radio via the radio transmitter.

2. The karaoke system of claim 1, wherein the mobile device further comprises a mobile device processor and an application stored in a mobile device memory, the application comprising second instructions for execution by the mobile device processor that, when executed, cause the processor to:
    receive user input regarding operation of the karaoke device.

3. The karaoke system of claim 2, wherein the user input comprises at least one of a radio frequency selection for the radio transmitter and an audio signal processing operation selection.

4. The karaoke system of claim 2, wherein the user input comprises a selection of the one of the plurality of music files.

5. The karaoke system of claim 2, wherein the mobile device further comprises a display, and the second instructions, when executed, further cause the mobile device processor to cause lyrics corresponding to one of the plurality of music files to be shown on the display.

6. The karaoke system of claim 1, wherein the audio signal processing operation comprises adding an echo, adjusting the treble, adjusting the base, or equalizing.

7. A karaoke system comprising:
a radio comprising a radio tuner and at least one speaker; and
a karaoke device comprising:
  a processor;
  a microphone;
  a wireless transceiver;
  a radio transmitter; and
  a memory, the memory storing a plurality of music files and instructions that, when executed by the processor, cause the processor to:
    receive, from the microphone, a first audio signal corresponding to vocals;
    generate, from one of the plurality of music files, a second audio signal corresponding to the one of the plurality of music files;
    mix the first and second audio signals to generate a playback audio signal;
    apply an audio signal processing operation to at least one of the first audio signal, the second audio signal, and the playback audio signal; and
    transmit the playback audio signal to the radio via the radio transmitter.

8. The karaoke system of claim 7, wherein the memory further stores a plurality of lyrics files, each of the plurality of lyrics files corresponding to one of the plurality of music files, and further wherein the instructions, when executed by the processor, further cause the processor to:
  establish a wireless connection with a mobile device via the wireless transceiver, the mobile device comprising a screen; and
  receive user input from the mobile device via the wireless transceiver.

9. The karaoke system of claim 8, wherein the instructions, when executed by the processor, further cause the processor to:
  transmit at least a portion of one of the plurality of lyrics files to the mobile device, the one of the plurality of lyrics files corresponding to the one of the plurality of music files used to generate the second audio signal.

10. The karaoke system of claim 8, wherein the instructions, when executed by the processor, further cause the processor to:
  transmit information corresponding to the plurality of music files to the mobile device; and
  receive, via the wireless transceiver, a selection of the one of the plurality of music files for use in generating the second audio signal.

11. The karaoke system of claim 8, wherein the user input comprises a radio frequency for use by the radio transmitter.

12. The karaoke system of claim 8, wherein the user input comprises selection of an audio signal processing operation from among a plurality of available audio signal processing operations stored in the memory of the karaoke device.

13. A karaoke system, comprising:
a mobile device comprising:
  a first processor;
  a first wireless transceiver; and
  a first memory; and
a karaoke device comprising:
  a second processor;
  a microphone;
  a second wireless transceiver;
  a radio transmitter; and
  a second memory, the second memory storing instructions that, when executed by the second processor, cause the second processor to:
    receive, from the mobile device and via the first and second wireless transceivers, a first audio signal corresponding a music file;
    receive, from the microphone, a second audio signal corresponding to vocals;
    mix the first and second audio signals to yield a playback audio signal; and
    apply an audio signal processing operation to at least one of the first audio signal, the second audio signal, and the playback audio signal.

14. The karaoke system of claim 13, further comprising a radio.

15. The karaoke system of claim 13, wherein the instructions, when executed by the second processor, further cause the second processor to transmit the playback audio signal via the radio transmitter.

16. The karaoke system of claim 13, wherein the first memory comprises streaming instructions that, when executed by the first processor, cause the first processor to stream selected pieces of music from a music library of the mobile device to the karaoke device.

17. The karaoke system of claim 16, wherein the music library is stored in the first memory.

18. The karaoke system of claim 13, wherein the first memory stores control instructions for execution by the first processor that, when executed, cause the first processor to:
  receive user input regarding operation of the karaoke device; and
  transmit a control signal to the karaoke device based on the received user input.

19. The karaoke system of claim 13, wherein the audio signal processing operation comprises adding an echo to one of the first audio signal, the second audio signal, and the playback audio signal.

20. The karaoke system of claim 13, wherein the karaoke device further comprises a wired communication port configured to receive data for storage in the second memory or power for recharging a battery of the karaoke device.

* * * * *